United States Patent [19]

Takigawa et al.

[11] Patent Number: 4,733,687
[45] Date of Patent: Mar. 29, 1988

[54] VALVE ACTUATOR FOR SLIDE EXHAUST BRAKE SYSTEMS

[75] Inventors: Kazunori Takigawa, Numazu; Ryoichi Suzuki, Mishima, both of Japan

[73] Assignee: Usui Kokusai Sangyo Kabushiki Kaisha, Shimizucho, Japan

[21] Appl. No.: 867,486

[22] Filed: May 27, 1986

[30] Foreign Application Priority Data

Jun. 6, 1985 [JP] Japan .............. 60-85410[U]

[51] Int. Cl.⁴ ............................................. F16K 49/00
[52] U.S. Cl. .................................. 137/338; 123/323; 188/273; 251/63.6
[58] Field of Search .................... 123/323; 137/338; 188/273; 251/63.6

[56] References Cited

U.S. PATENT DOCUMENTS

| | | | |
|---|---|---|---|
| 997,038 | 7/1911 | Brummer | 251/60 X |
| 1,348,604 | 8/1920 | Titus | 251/63.4 |
| 1,412,473 | 4/1922 | Lane | 137/102 |
| 1,506,012 | 8/1924 | Lewis | 137/102 UX |
| 1,727,591 | 9/1929 | Fridstein et al. | 251/285 X |
| 1,752,229 | 3/1930 | Brueckel | |
| 2,062,126 | 11/1936 | Gibson | 251/337 X |
| 2,241,324 | 5/1941 | Selby | 251/60 X |
| 2,709,897 | 6/1955 | Millikan | 251/326 X |
| 2,800,112 | 7/1957 | Williams | 123/97 B |
| 2,845,306 | 7/1958 | Carver | 137/338 X |
| 2,873,761 | 2/1959 | Tailleferre | 137/630.12 X |
| 2,997,851 | 8/1961 | Trubert | 251/63.4 X |
| 3,036,807 | 5/1962 | Lucky et al. | 251/77 X |
| 3,136,332 | 6/1964 | Nixon | 251/285 X |
| 3,221,770 | 12/1965 | Faisandier | 137/625.68 X |
| 3,333,814 | 8/1967 | Sargent | 251/326 X |
| 3,420,262 | 1/1969 | O'Neill | 251/214 X |
| 3,621,878 | 11/1971 | Smith | 137/595 |
| 3,720,227 | 3/1973 | Curran | 137/338 X |
| 3,851,658 | 12/1974 | Bunyard | 137/102 |
| 3,895,648 | 7/1975 | Stoll et al. | 137/102 |
| 4,054,156 | 10/1977 | Benson | 137/630.12 |
| 4,062,332 | 12/1977 | Perr | 188/273 X |
| 4,093,046 | 6/1978 | Perr | 188/273 |
| 4,205,704 | 6/1980 | Benson | 188/273 X |
| 4,408,627 | 10/1983 | Harris | 188/273 X |
| 4,452,269 | 6/1984 | Kindermann | 137/338 |
| 4,553,648 | 11/1985 | Suzuki et al. | 188/273 |

FOREIGN PATENT DOCUMENTS

| | | |
|---|---|---|
| 230876 | 12/1959 | Australia . |
| 728503 | 11/1942 | Fed. Rep. of Germany . |
| 3009453 | 9/1981 | Fed. Rep. of Germany ...... 137/338 |
| 1122341 | 9/1956 | France . |
| 123328 | 9/1980 | Japan ................................. 123/323 |
| 123330 | 9/1980 | Japan ................................. 123/323 |
| 117047 | 9/1980 | Japan ................................. 123/323 |
| 60-3437 | 1/1985 | Japan ................................. 123/323 |
| 1378497 | 12/1974 | United Kingdom ............... 251/63.6 |

Primary Examiner—Gerald A. Michalsky
Attorney, Agent, or Firm—Anthony J. Casella; Gerald E. Hespos

[57] ABSTRACT

Herein disclosed is a valve actuator which is to be used with a slide exhaust brake system. The valve actuator includes a cylinder casing which is constructed of: a shortened cylinder body having a length substantially equal to the sliding distance of a piston member fitted therein; and a cylindrical wall fixed on the inner side of the bottom wall of the cylinder body such that the cylinder body has its lower end merging around its circumference into the circumference of the upper end of the cylindrical wall. The heat to be transferred from the exhaust brake system to the actuator is effectively reduced by a thermal impulse at the fixing portion between the cylinder body and the cylindrical wall to exert less thermal influences upon the packing of the piston member. Moreover, the cylinder casing of the actuator can be formed simply by cutting an elongated cylinder member having its inner circumference subjected to a necessary treatment and by fixing the cut cylinder member to the cylindrical wall having its inner circumference left untreated.

5 Claims, 2 Drawing Figures

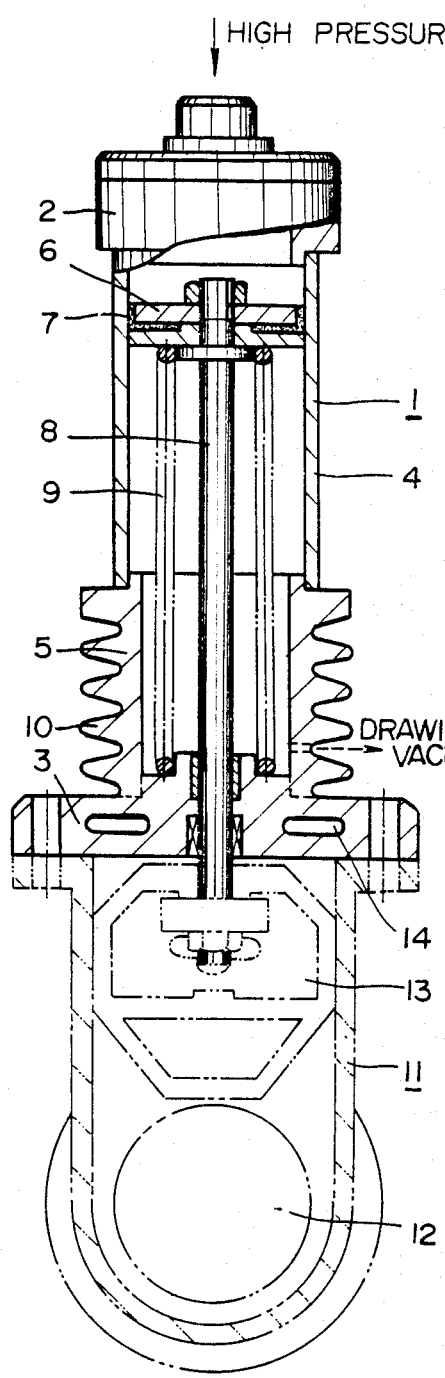
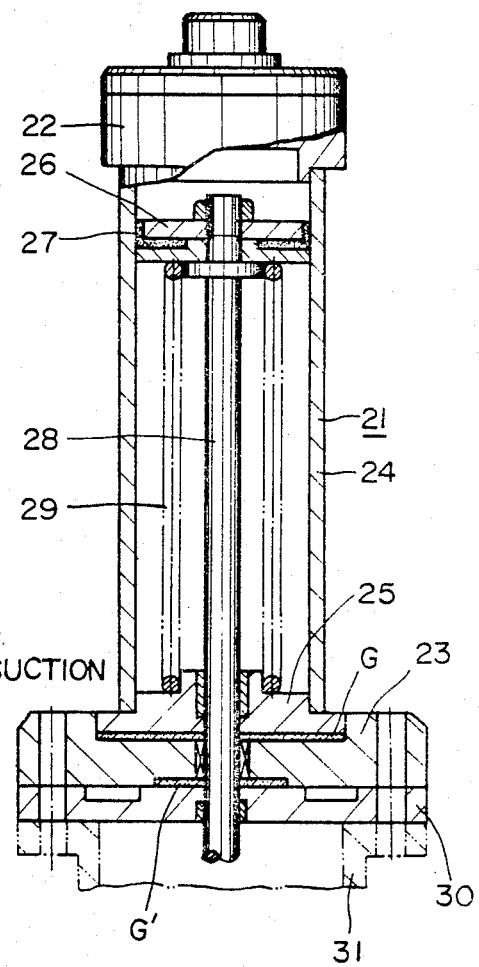
FIG. 1
FIG. 2 PRIOR ART

VALVE ACTUATOR FOR SLIDE EXHAUST BRAKE SYSTEMS

BACKGROUND OF THE INVENTION

1. Field of the Invention

The present invention relates generally to a slide exhaust brake system disposed midway of the exhaust pipe of a large-sized vehicle such as a truck or bus for braking the vehicle running on a steep downhill by shutting off the exhaust gas passage of the exhaust pipe and, more particularly, to an improvement in a valve actuator for use with the slide exhaust brake system.

2. Description of the Prior Art

According to the prior art, the valve actuator of the above-specified type is constructed, as shown in FIG. 2, of a gas-tight cylinder casing 21 which in turn is composed of an elongated cylinder body 24 made of aluminum, iron or stainless steel and integrated at its upper end with a head wall 22 having an intake/exhaust port and at its lower end with a bottom wall 23 of aluminum with or without an intake/exhaust port. In the cylinder casing 21 thus composed, there is fitted a piston member 26 which clamps a packing 27. In the inner side of the bottom wall 23, there is anchored a spring bearing member 25 which is also made of aluminum. The piston member 26 has its piston rod 28 projecting to the outside through the bottom wall 23 and a partition 30. On the end portion of the projection of the piston rod 28, there is carried a plate valve member (although not shown) for opening or closing the exhaust gas passage of an exhaust brake system 31 which is fastened to both the bottom wall 23 and the partition 30. Incidentally, reference numeral 29 denotes a coil spring which is fitted under compression between the piston member 26 and the spring bearing member 25 for biasing the former member 26 upward. On the other hand, reference letters G and G' denote heat insulating gaskets which are sandwiched between the bearing member 25 and the bottom wall 23 and between the bottom wall 23 and the partition 30.

Generally speaking, the exhaust brake system is heated to a very high temperature while the vehicle is running because it is always exposed to the hot exhaust gas of the engine. The actuator has to be freed as much as possible from the thermal influences from the hot exhaust brake system so that it may operate smoothly and reliably. The counter-measures for this necessity have been desired. However, this desire cannot be fully satisfied by the actuator of the prior art, which has a tendency to fail to sufficiently reduce the heat to be transferred thereto in dependence upon the elongated integral structure of the cylinder body 24 of aluminum, iron or stainless steel, even with the provision of the heat insulating gaskets G and G'. That tendency causes the actuator to be still heated to a high temperature after a long run so that the piston member 26, especially its packing 27 is thermally influenced to lose its sealing characteristics with the cylinder body 24 at an early stage thereby to invite leakage. This results in a problem that the actuator has its piston function degraded to be troubled in its expected long use.

In order to provide a sliding face for the piston member, on the other hand, the elongated integral cylinder body 24 must have its whole inner circumference subjected to an anodizing, honing or chromium-plating treatment to have a hardened surface. This treatment raises the cost for the material and deteriorates the workability so that it accordingly raises the production cost.

SUMMARY OF THE INVENTION

In order to solve the problem of the prior art remarkably effectively, therefore, an object of the present invention is to provide a valve actuator accumulator which can be produced at a reasonable cost. In the present invention, the cylinder casing is composed of two members—a shortened cylinder body having a length substantially equal to the sliding distance of the piston member fitted therein, and a cylindrical wall fixed on the inner side of the bottom wall such that the cylinder body has its lower end merging around its circumference into the circumference of the upper end of the cylindrical wall. Thus, the heat to be transferred from the exhaust brake system to the actuator is effectively reduced by a thermal impulse at the fixing portion between the above-specified two members to exert less thermal influences upon the packing of the piston member. As a result, the deterioration in the piston function, which might otherwise be caused by the degradation in the packing characteristics due to the heat transfer, is prevented to ensure the elongated reliable use of the product. Moreover, the cylinder casing of the actuator can be formed simply by cutting an elongated cylinder member having its inner circumference subjected to a necessary treatment and by fixing the cut cylinder member to the cylindrical wall having its inner circumference left untreated. As a result, the actuator can have its production cost dropped.

According to a major feature of the present invention, there is provided a valve actuator for use with a slide exhaust brake system comprising: a sealed cylinder casing having a head wall fixed to the upper end thereof and a bottom wall fixed to the lower end thereof; a piston member fitted in said cylinder casing and having its piston rod projecting at its end portion to the outside through said bottom wall; and a plate valve member carried on the end portion of said piston rod for opening or closing the exhaust gas passage of said exhaust brake system which is to be fastened to the bottom wall of said cylinder casing, wherein the improvement resides: in that said cylinder casing includes a cylinder body shortened to have a length substantially equal to the sliding distance of said piston member fitted therein, and a cylindrical wall fixed on the inner side of the bottom wall of said cylinder casing; and in that the cylinder body has its lower end merging at the circumference thereof into the upper end of said cylindrical wall at the circumference thereof. According to other features of the present invention, said cylinder body and said cylindrical wall are made of different materials or constructed of separate members, and said cylindrical wall is formed with radiation fins on its outer circumference.

BRIEF DESCRIPTION OF THE DRAWING

FIG. 1 is a partially cut-away longitudinal section showing a valve actuating cylinder unit (of single-acting type) for use with a slide exhaust brake system according to one embodiment of the present invention; and FIG. 2 is a partially cut-away longitudinal section showing the valve actuating air cylinder unit (of single-acting type) itself according to the prior art.

DESCRIPTION OF THE PREFERRED EMBODIMENT

The present invention will be described in the following in connection with one embodiment thereof with reference to the accompanying drawing. Denoted generally at reference numeral 1 is a cylinder casing of an actuator, which is constructed in a sealed manner of a cylinder body 4 such that a head wall 2 having a port for supplying air under pressure is fixed to the upper end of the cylinder casing 1 whereas a bottom wall 3 is fixed to the lower end of the same. The cylinder body 4 is made of a cylindrical material of aluminum, iron or stainless steel, which has a shortened length substantially equal to the sliding distance of a piston member 6 fitted therein. Denoted at numeral 5 is a cylindrical wall which is made of aluminum, iron or stainless steel and fixed on the upper or inner side of the bottom wall 3 either integrally with or separately of, as indicated by broken lines in FIG. 1, the bottom wall. The cylindrical wall 5 is formed in the outer circumference of its lower end either with a vacuum suction port or an intake/discharge port (as in the single- or double-acting type) or without the same (as in the single-acting type). The circumference of the lower end of the cylinder body 4 is fixed to that of the upper end of the cylindrical wall 5 by a general method such as the welding, soldering, adhering, press-fitting or shrink-fitting method. On the other hand, the bottom wall 3 is made of iron or stainless steel because it is subjected to the heat impulse of a later-described plate valve member 13. Denoted at numeral 7 is a packing which is made of Teflon or silicon rubber and clamped by the piston member 6. This piston member 6 has its piston rod 8 projecting to the outside through the bottom wall 3 and carrying at its projecting end portion the aforementioned plate valve member 13 for opening or closing an exhaust gas passage 12 of an exhaust brake system 11 fastened to the bottom wall 3.

Incidentally, reference numeral 9 denotes a coil spring which is interposed under compression between the piston member 6 and the inner side of the bottom wall 3 for biasing the former member 6 upward. Denoted at numeral 10 are radiation fins which are integrally formed on the outer circumference of the cylindrical wall 5. Denoted at numeral 14 is a hole for thermal radiation. The cylindrical wall 5 is desired to have a length substantially equal to the total height of the coil spring 9 which is held in its compressed state for closing the valve member 13. It is quite natural that the gist of the present invention would not be jeopardized even if the heat insulating gaskets or the partition of the prior art were desirably laid or sandwiched between the fastening faces of the bottom wall 3 and the housing of the exhaust brake system 11.

Now, the cylinder body 4 must have its inner circumference smoothened so as to allow the piston member 6 to slide therein, but its surface treating method is different in dependence upon the material thereof. This material will be described in the following in connection with the method of preparing the cylinder body 4. In case the cylinder body 4 is made of aluminum, for example, a seamless material tube is formed from aluminum billets by a hot extrusion. Then, the material tube has its inner face honed to adjust the accuracy of its internal diameter, the roundness and the surface roughness and then anodized to acquire such a hardness as to improve its wear resistance and corrosion resistance while reducing its friction coefficient. In order to adjust the diameter and thickness, if necessary, the material tube thus anodized may be subjected to a cold drawing treatment and honed again.

In the case of the iron material, on the other hand, a seamless material tube is formed either from iron billets by a hot extrusion or from hoop iron by rolling the hoop iron and by electrically welding the two longitudinal edges. Then, the material tube thus formed is drawn to adjust its diameter and thickness and has its inner face honed to adjust the accuracy of its internal diameter, the roundness and the surface roughness. Then, the material tube thus honed has its inner face plated with hard chromium to improve its wear resistance and corrosion resistance while reducing its friction coefficient.

In the case of the stainless steel material, on the other hand, hoop stainless steel is rolled and electrically welded at its longitudinal edges. Then, the material tube is extracted like the tube of the iron material and is finished by having its inner side honed.

On the contrary, however, the cylindrical wall 5 need not have its inner face subjected to the aforementioned treatments because it does not provide a face for sliding the piston member 6.

According to the present invention, each shortened cylinder body 4 may have its inner face subjected to the above-specified treatments. However, the productivity and workability can be considerably improved if a long cylindrical member having its inner circumference subjected to the surface treatments is prepared and cut to the cylinder bodies 4 having a predetermined length and if each of the cylinder bodies 4 is fixed on the cylindrical wall 5 having been prepared in advance but with no surface treatment.

Thus, according to the present invention, the cylinder casing 1 is formed by fixing the circumference of the upper end of the cylindrical wall 5 formed integrally or not with the bottom wall 3 to the circumference of the lower end of the cylinder body 4 having the shortened length substantially equal to the sliding distance of the piston member 6. At this fixed or joined portion, a thermal impulse is caused to reduce the heat transfer from the exhaust brake system 11 to the actuator so that especially the packing 7 of the piston member 6 is less thermally influenced.

This heat insulating effect is improved due to the difference in the ratio between the thermal conductivities (i.e., 1:2.7) of the iron or stainless steel material and the aluminum material especially by making the cylindrical wall 5 of iron or stainless steel and the cylinder body 4 of aluminum.

As has been described hereinbefore, the valve actuator for use with the slide exhaust brake system according to the present invention reduces the heat transfer which might otherwise be caused thereto by the thermal impulse. As a result, the piston member 6 can have its packing 7 freed from degraded by the thermal influences so that it can be used for a long time while exhibiting its functions without any trouble. At the same time, since the surface treatment to be exerted upon the inner circumference may be limited to the shortened cylinder body 4, the actuator can have its material and production costs dropped. If desired, moreover, the cylindrical wall 5 may be formed on its outer circumference with the radiation fins 10 to enlarge its radiation surface area. If the heat insulating gaskets are fitted in the fastening faces of the bottom wall 3 and the housing of the exhaust brake system 11, the heat transfer to the air cylinder system can be more effectively reduced. Thus, it is possible to provide a remarkably useful valve actuating air cylinder unit.

What is claimed is:

1. A valve actuator for use with a slide exhaust brake system having an exhaust gas passage, said valve actuator comprising: a sealed cylinder casing having a head wall fixed to the upper end thereof and a bottom wall fixed to the lower end thereof; a piston member fitted in said cylinder casing and having its piston rod projecting at its end portion to the outside through said bottom wall; and a plate valve member carried on the end portion of said piston rod for opening or closing the exhaust gas passage of said exhaust brake system which is to be fastened to the bottom wall of said cylinder casing, and a coil spring surrounding said piston rod and disposed intermediate said piston member and said bottom wall for urging said plate valve member toward the open position, wherein the improvement resides: in that said cylinder casing includes a cylinder body having one end fixed to said head wall and having a length generally equal to the sliding distance of said piston member fitted therein, and a cylindrical wall surrounding and spaced radially from said piston rod and said coil spring and having one end fixed on the inner side of the bottom wall of said cylinder casing and having its opposed end fixed to the end of the cylinder body opposite the head wall said cylindrical body having a length generally equal to the length of the coil spring in a compressed condition corresponding to the closed position of the plate valve, the cylindrical wall having its outer circumference formed with a plurality of radiation fins, whereby the cylindrical wall substantially spaces said cylinder body and said piston member from the exhaust gas passage and provides a substantially shortened cylinder body.

2. A valve actuator as set forth in claim 1, wherein said cylindrical wall is made integrally with the bottom wall of said cylinder casing.

3. A valve actuator as set forth in claim 1, wherein said cylindrical wall is made separately of the bottom wall of said cylinder casing.

4. A valve actuator for a slide exhaust brake system having an exhaust gas passage for placement in communication with an exhaust system and having a plate valve member selectively slidable into said exhaust gas passage, said valve actuator comprising:

a piston rod connected to said plate valve member;

a piston member connected to said piston rod at an end thereof remote from said plate valve member;

a bottom wall mounted to said exhaust brake system, said bottom wall including an aperture exending therethrough, said piston rod extending through said aperture such that the plate valve member is disposed on one side of said bottom wall and such that said piston member is disposed on the opposite side of said bottom wall;

a coil spring surrounding said piston rod and extending between said piston member and said bottom wall for urging said piston member away from said bottom wall, such that said spring is in a compressed condition when said plate valve member is in said exhaust passage;

a cylindrical wall formed from a first metal material having one end fixed to said bottom wall and substantially surrounding said piston rod and said coil spring, said cylindrical wall having a length generally equal to the length of the coil spring in the compressed condition, the cylindrical wall having its outer circumference formed with a plurality of a radiation fins;

a cylinder body fixed to the end of said cylindrical wall opposite said bottom wall, said cylinder body substantially surrounding said piston member and having a length substantially equal to the sliding distance of said piston member, said cylinder body being formed from a second metal material;

a packing disposed intermediate said piston member and said cylinder body; and a head wall fixed to the end of said cylinder body opposite said cylindrical wall, whereby the cylindrical wall insulates the cylinder body, the piston member and the packing from heat generated by said exhaust brake system, and enables a substantially shortened cylinder body.

5. A valve actuator as in claim 4 wherein said cylindrical wall and said bottom wall are of unitary construction.

* * * * *